United States Patent
Chen et al.

(10) Patent No.: US 10,939,393 B2
(45) Date of Patent: Mar. 2, 2021

(54) HANDLING TIME INDEXING IN LTE-NR CO-EXISTENCE

(71) Applicant: QUALCOMM Incorporated, San Diego, CA (US)

(72) Inventors: Wanshi Chen, San Diego, CA (US); Yeliz Tokgoz, San Diego, CA (US); Haitong Sun, Cupertino, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 15/881,342

(22) Filed: Jan. 26, 2018

(65) Prior Publication Data

US 2018/0234930 A1 Aug. 16, 2018

Related U.S. Application Data

(60) Provisional application No. 62/457,636, filed on Feb. 10, 2017.

(51) Int. Cl.
| | |
|---|---|
| *H04W 56/00* | (2009.01) |
| *H04L 5/14* | (2006.01) |
| *H04W 72/00* | (2009.01) |
| *H04W 4/06* | (2009.01) |
| *H04W 72/04* | (2009.01) |
| *H04W 48/12* | (2009.01) |
| *H04W 48/16* | (2009.01) |

(52) U.S. Cl.
CPC ............ *H04W 56/001* (2013.01); *H04L 5/14* (2013.01); *H04W 4/06* (2013.01); *H04W 48/12* (2013.01); *H04W 56/002* (2013.01); *H04W 72/005* (2013.01); *H04W 72/044* (2013.01); *H04W 72/0406* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 2012/0115485 A1* | 5/2012 | Narasimha | H04W 68/02 455/437 |
| 2013/0242974 A1 | 9/2013 | Li | |
| 2013/0250818 A1 | 9/2013 | Gaal et al. | |

(Continued)

FOREIGN PATENT DOCUMENTS

| | | |
|---|---|---|
| WO | 2016071021 A1 | 5/2016 |
| WO | 2016073927 A1 | 5/2016 |

OTHER PUBLICATIONS

International Search Report and Written Opinion—PCT/US2018/015616—ISA/EPO—dated Jul. 4, 2018.

(Continued)

*Primary Examiner* — Lonnie V Sweet
(74) *Attorney, Agent, or Firm* — Patterson +Sheridan, L.L.P./Qualcomm Incorporated

(57) ABSTRACT

Certain aspects of the present disclosure relate to methods and apparatus for handling time indexing in LTE-NR coexistence. In certain aspect, a method for use by a user equipment includes determining a first time index based on a first radio access technology (RAT) network, determining a second time index based on a second RAT network, and performing system acquisition based on the second RAT network the second time index.

29 Claims, 9 Drawing Sheets

(56) References Cited

U.S. PATENT DOCUMENTS

| | | | |
|---|---|---|---|
| 2017/0135071 A1* | 5/2017 | Sundberg | H04W 4/00 |
| 2017/0325246 A1* | 11/2017 | Agarwal | H04W 72/1215 |
| 2018/0020462 A1* | 1/2018 | Xiong | H04W 56/0005 |
| 2018/0077632 A1* | 3/2018 | Frenger | H04W 48/06 |
| 2018/0213599 A1* | 7/2018 | Kazmi | H04W 72/1215 |
| 2018/0242316 A1* | 8/2018 | Takeda | H04W 72/0446 |
| 2018/0324828 A1* | 11/2018 | Mukherjee | H04W 16/14 |
| 2019/0013881 A1 | 1/2019 | Olesen et al. | |
| 2019/0029003 A1* | 1/2019 | Takeda | H04W 4/06 |
| 2019/0306855 A1* | 10/2019 | Tiirola | H04L 27/2655 |
| 2019/0342888 A1* | 11/2019 | Hosseini | H04W 16/14 |

OTHER PUBLICATIONS

Qualcomm Incorporated: "NR LTE Coexistence," 3GPP Draft; R1-1700841 NR LTE Coexistence, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017, XP051208360, 5 pages, Retrieved from the Internet: URL: http://www.3gpp.org/ftp/Meetings_3GPP_SYNC/RAN1/Docs/ [retrieved on Jan. 16, 2017].

* cited by examiner

HANDLING TIME INDEXING IN LTE-NR CO-EXISTENCE

CROSS-REFERENCE TO RELATED APPLICATIONS

This application claims the benefit of and priority to U.S. Provisional Application Ser. No. 62/457,636 entitled "HANDLING TIME INDEXING IN LTE-NR CO-EXISTENCE," which was filed Feb. 10, 2017. The aforementioned application is herein incorporated by reference in its entirety as if fully set forth below in its entirety and for all applicable purposes.

FIELD

The technology described below relates generally to communication systems, and more particularly, to methods and apparatus relating to handling time indexing in LTE-NR co-existence. Certain embodiments enable and provide scenarios where LTE and NR network technologies can be employed in a co-channel manner and devices capable of operating in such manners to improve user experience.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Certain aspects provide a method for wireless communication by a user equipment. The method generally includes determining a first time index based on a first radio access technology (RAT) network, determining a second time index based on a second RAT network, performing system acquisition based on the second RAT network using the second time index.

Also described herein are embodiments of an apparatus for wireless communications comprising a processing system configured to determine a first time index based on a first radio access technology (RAT) network, determine a second time index based on a second RAT network, and perform system acquisition based on the second RAT network using the second time index.

Also described herein are embodiments of an apparatus for wireless communications comprising means for determining a first time index based on a first radio access technology (RAT) network, means for determining a second time index based on a second RAT network, and means for performing system acquisition based on the second RAT network using the second time index.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
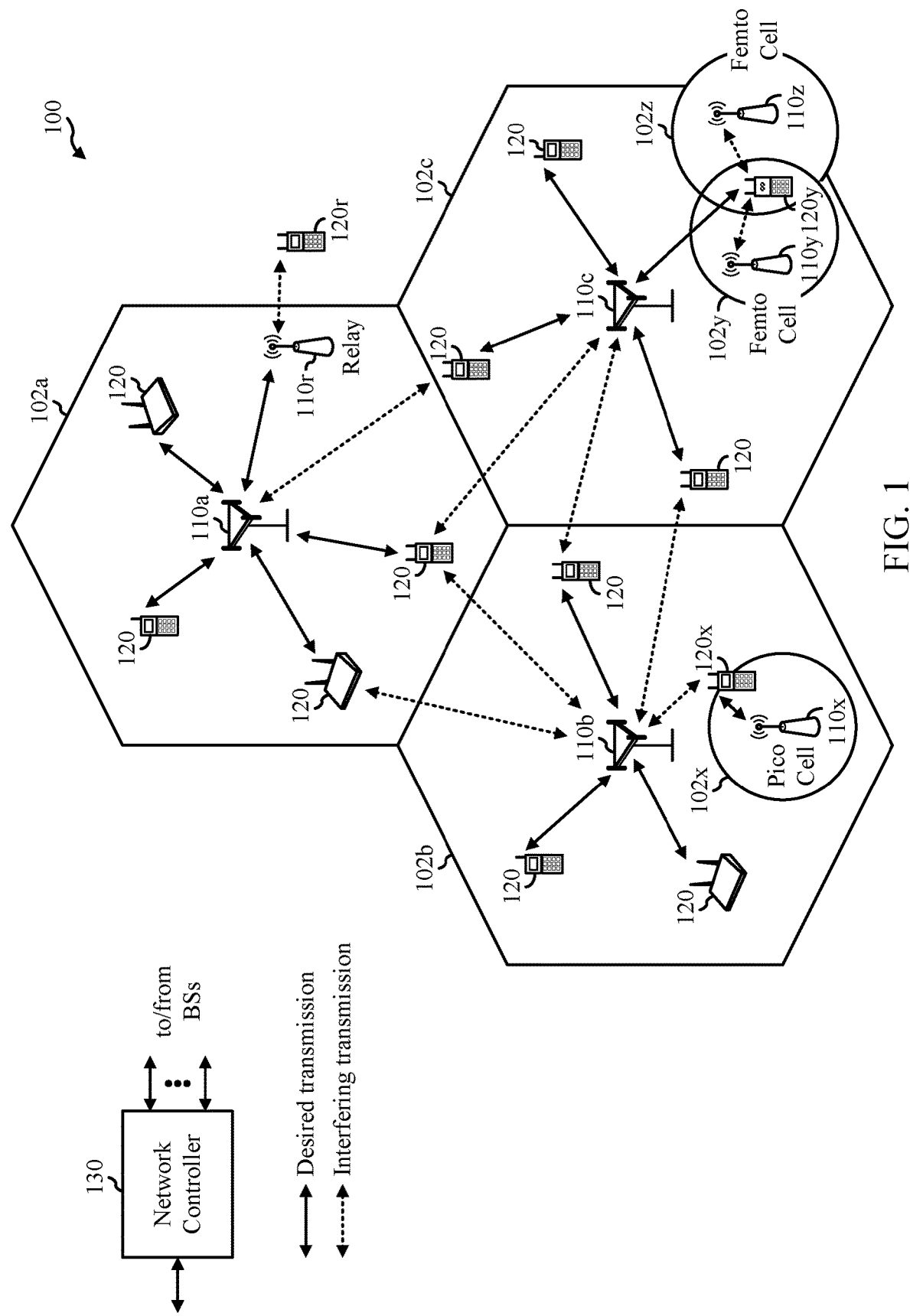
FIG. 1 is a block diagram conceptually illustrating an example telecommunications system, in accordance with certain aspects of the present disclosure.

Aspects of the present disclosure relate to handling time indexing in LTE-NR co-existence. Some aspects provide options for subframe indexing and PSS/SSS/PBCH positioning for LTE/NR coexistence in different scenarios. This may include, for example, NR in only LTE MBSFN or both subframes.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

As described below, to assist UE 120 with cell search, BS 110 may transmit two special signals, the Primary Synchronization Signal (PSS) and the Secondary Synchronization Signal (SSS), on each downlink component carrier. Under the LTE standards, certain arrangements for the time-domain positions for the transmission of PSS, SSS, and also the physical broadcast channel (PBCH) have been agreed to, which enable UE 120 to subframe indices after detecting PSS and SSS. Unlike the PSS/SSS design agreed to under the LTE standards, the PSS/SSS/PBCH design is a work in progress under the NR/5G standards as of the time of this filing. Certain embodiments described herein relate to handling time indexing in LTE-NR co-existence (e.g., where NR may share an uplink and/or downlink carrier frequency with LTE) in light of the differences in the PSS/SSS/PBCH design between the LTE and NR standards.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
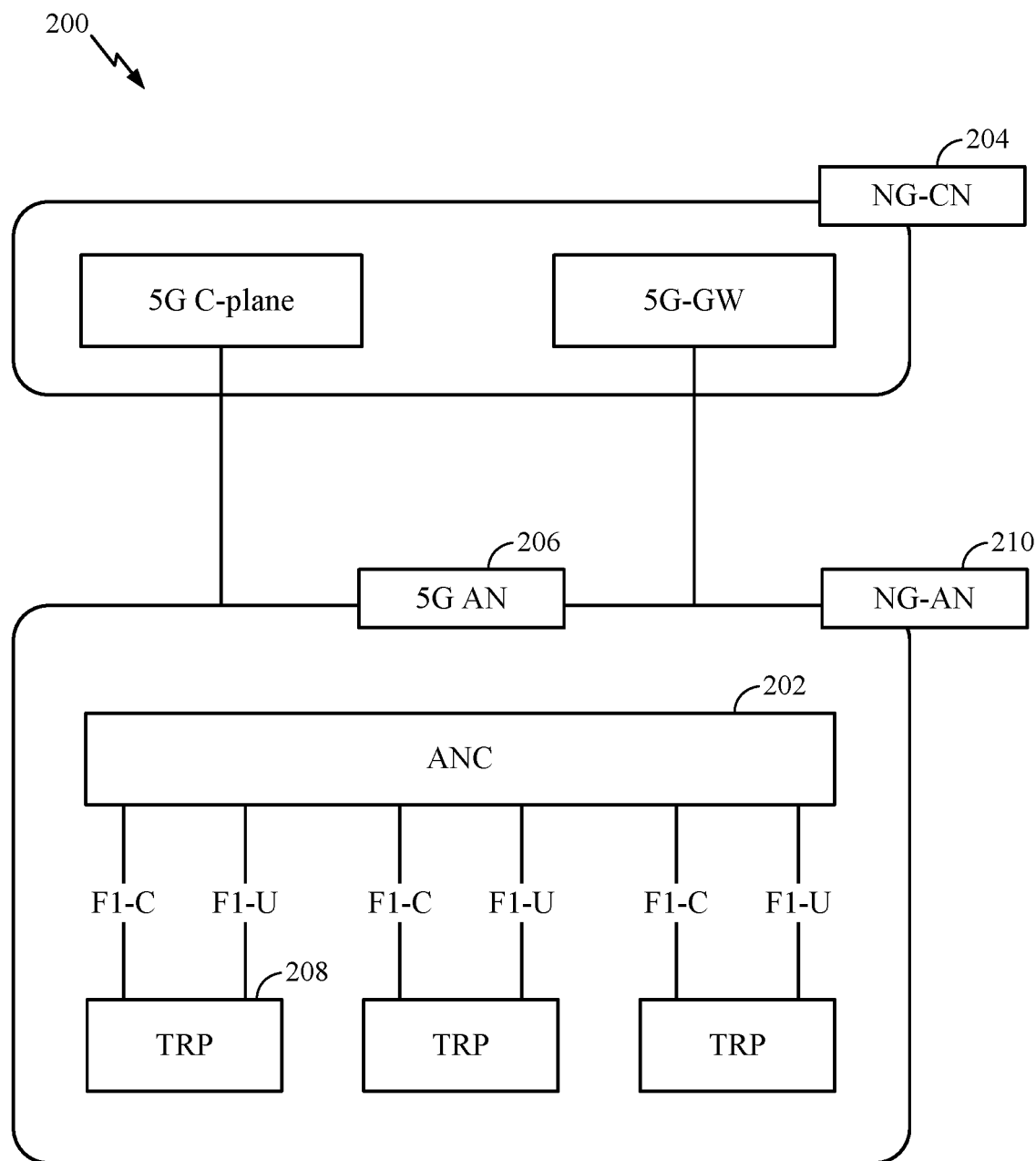
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
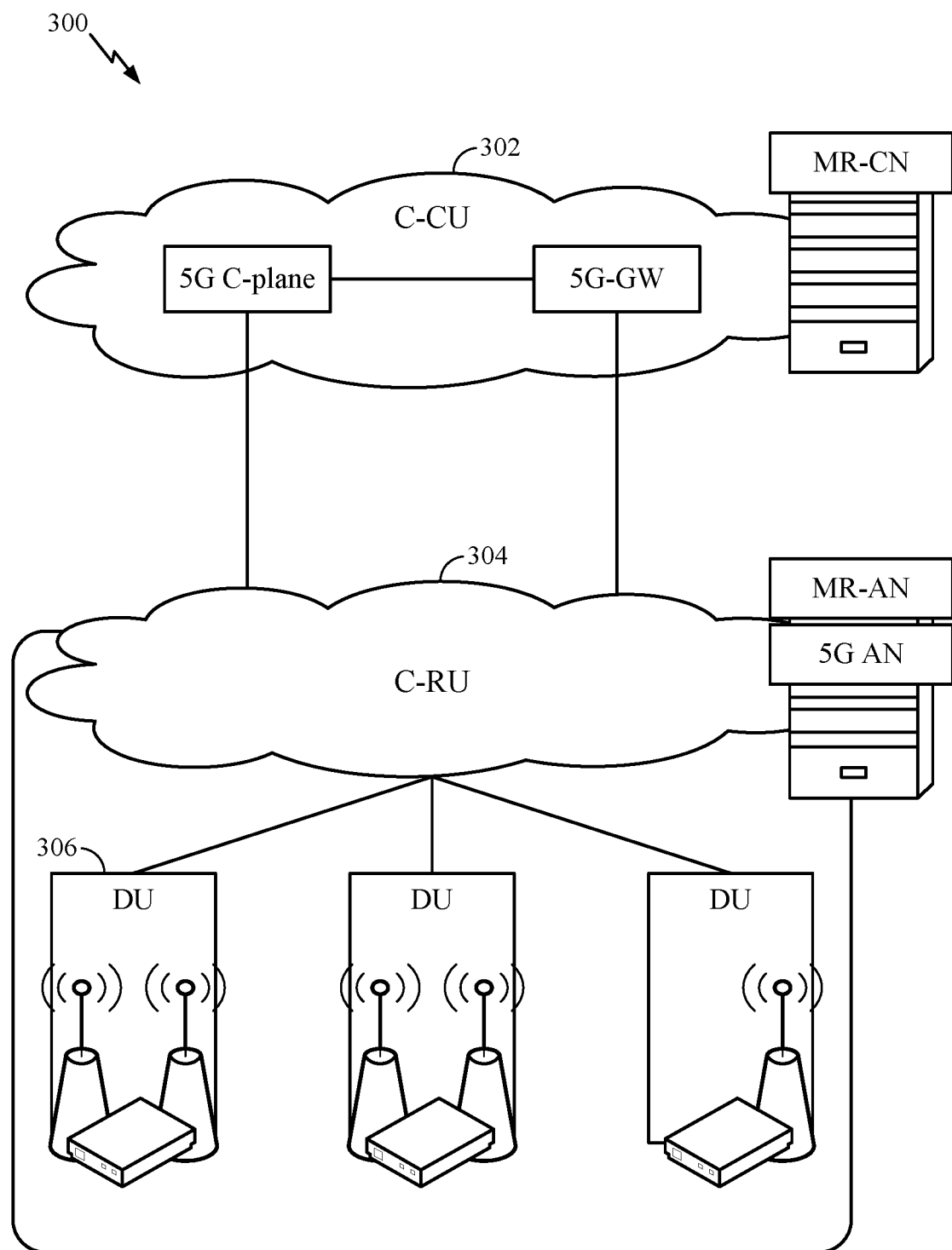
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
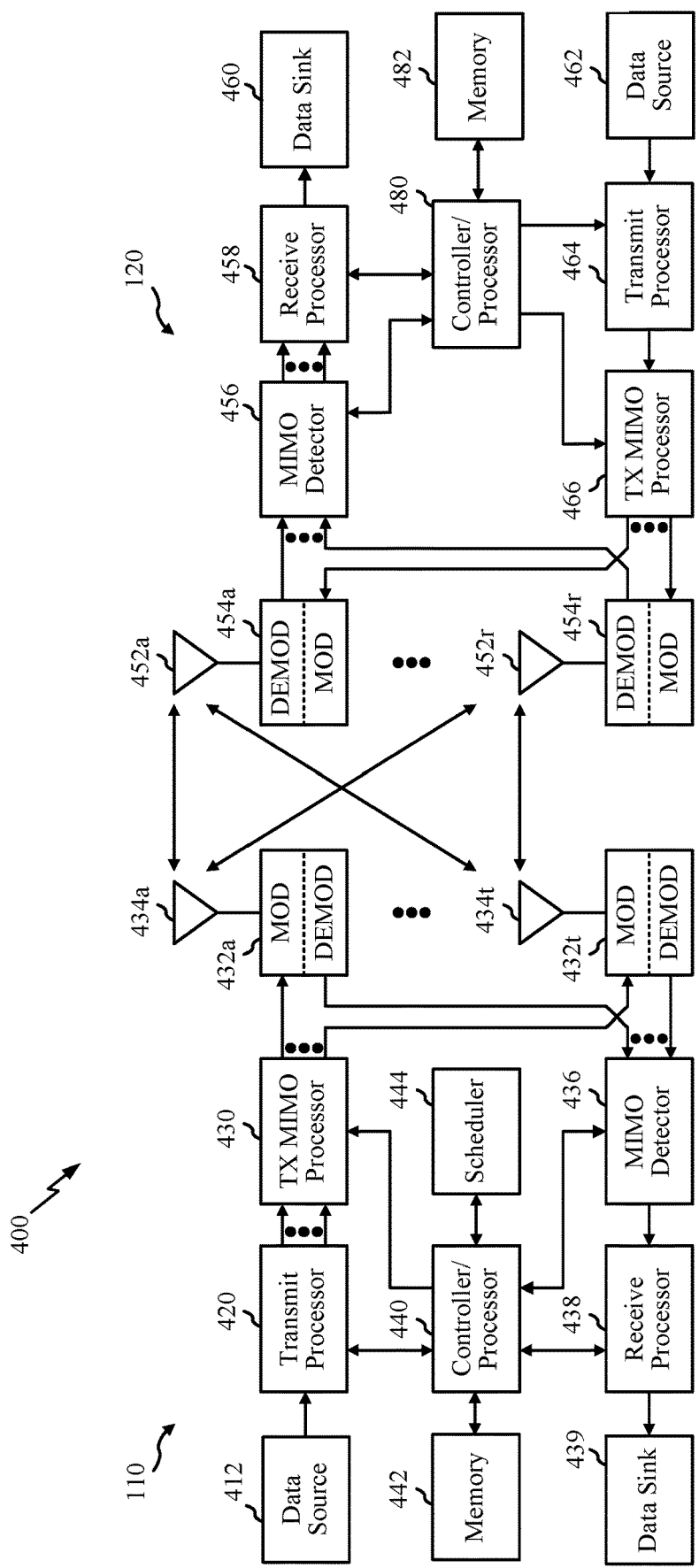
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 8.

FIG. 4 shows a block diagram of a design of a BS 110 and a UE 120, which may be one of the BSs and one of the UEs in FIG. 1. For a restricted association scenario, the base station 110 may be the macro BS 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 8, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
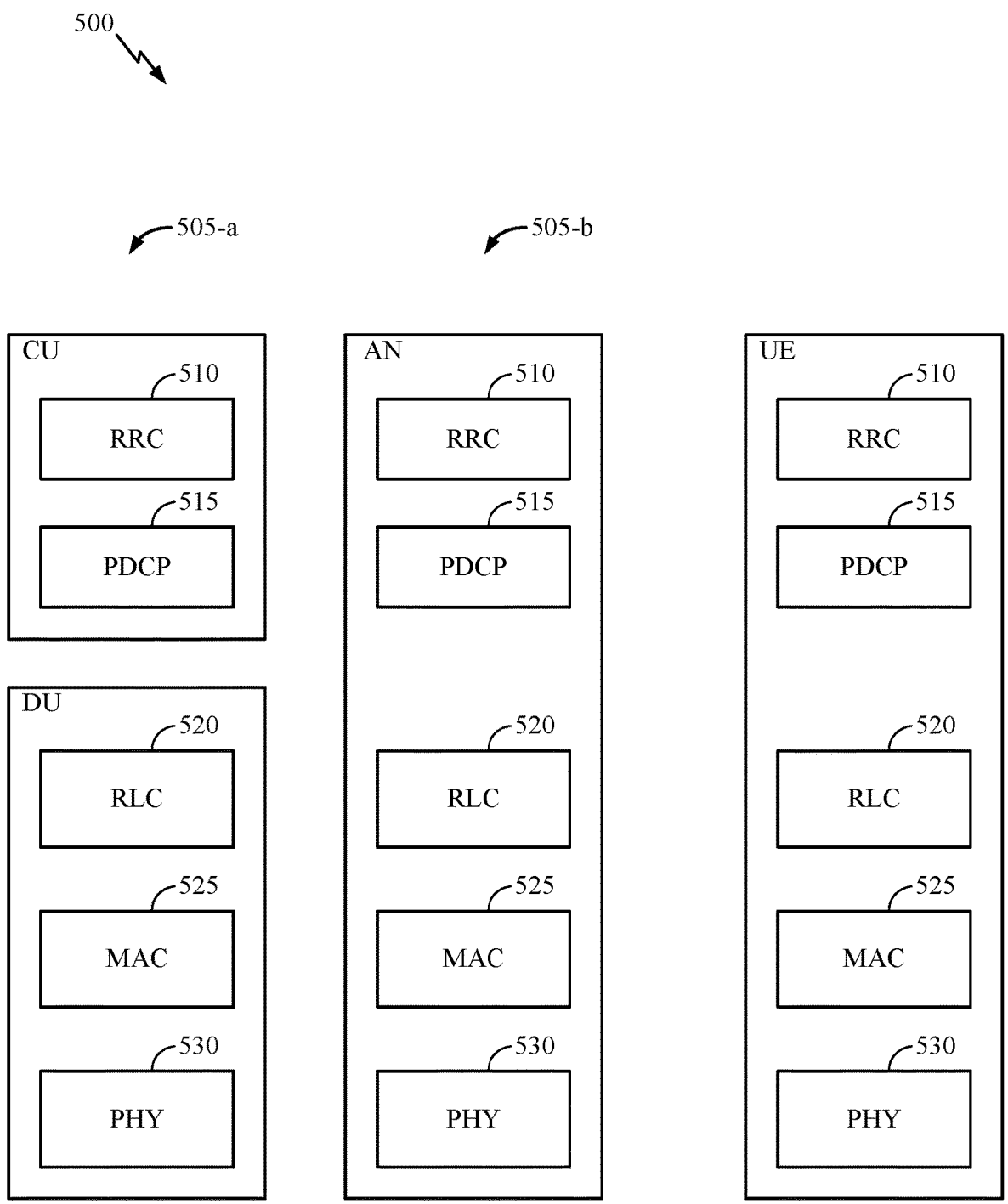
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
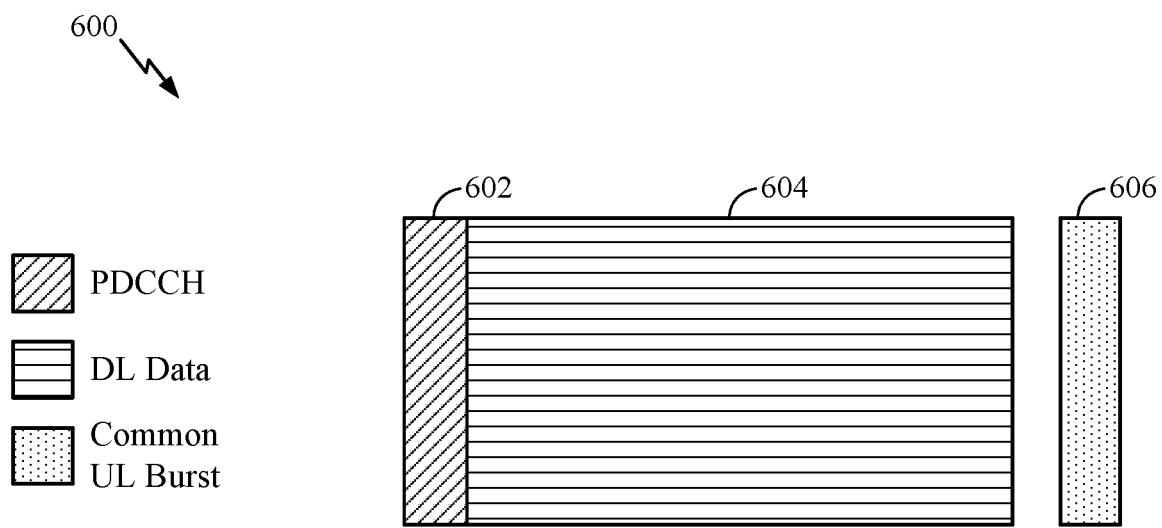
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
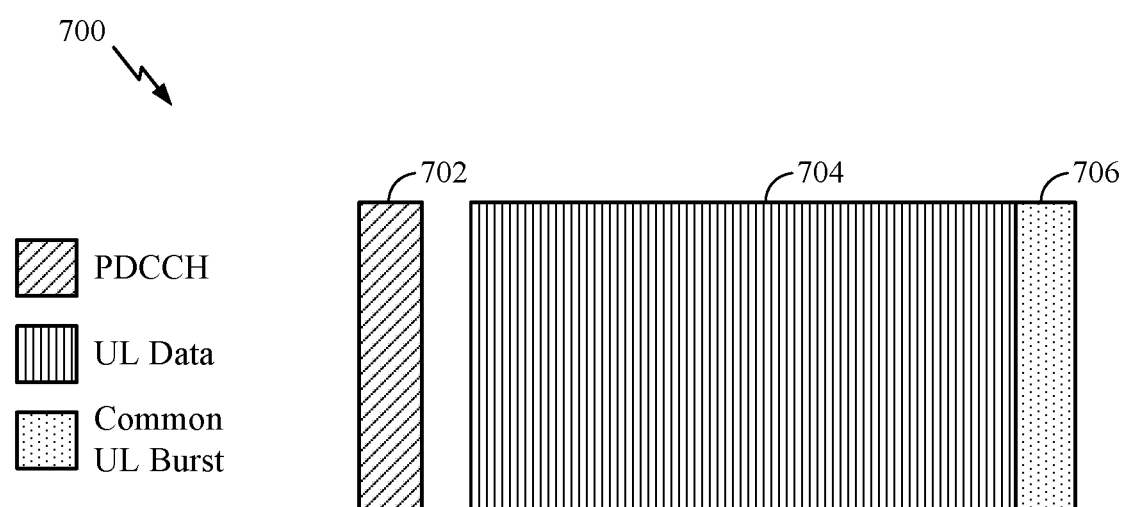
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Handling Time Indexing in LTE-NR Co-Existence

To assist a user equipment (e.g., UE 120) with cell search, a base station (e.g., BS 110) transmits two special signals, the Primary Synchronization Signal (PSS) and the Secondary Synchronization Signal (SSS), on each downlink component carrier. Although having the same detailed structure, the time-domain positions of the synchronization signals within a radio frame differ somewhat depending on whether the cell is operating in frequency division duplexing (FDD) or time division duplexing (TDD). In some cases, under the LTE standards, the PSS is broadcast twice within every radio frame, and within one cell, where the two PSSs within every frame are identical. The SSS is also broadcast twice within every radio frame. For example, the PSS (primary synchronization signal) and SSS (secondary synchronization signal) ("PSS/SSS") may be transmitted in subframes 0 and 5 of every frame (i.e., 10 subframes), while the physical broadcast channel (PBCH) may be transmitted in subframes 0 of every frame. The arrangement or the location of PSS/SSS in subframe 0 and the arrangement or the location of PSS/SSS in subframe 5 may enable the UE to detect the subframe indices after detecting PSS/SSS. To enable the UE to detect which is the first SSS transmitted and which is the second, the two SSSs are different unlike the PSS.

In addition to PSS/SSS, under the LTE standards, the UE may detect PBCH, based on which, in some cases, a system frame number (SFN) may be derived. PBCH may contain an 8-bit SFN, plus a 40 ms periodicity of a PBCH content update. In some cases, the SFN may comprise a total of 10 bits (another 2-bit of implicit SFN information, considering PBCH is transmitted every 10 ms).

In some cases, multicast-broadcast single-frequency network (MBSFN) subframes may be configured in LTE to provide multimedia broadcast multicast service (MBMS) services, future compatibility, and more efficient demodulation reference signal (DM-RS) based services. For example, for UEs not monitoring MBSFN subframes, the MBSFN region in the received subframes may be completely blank. In some cases, up to 6 subframes in a frame may be configured for MBSFN subframes. In FDD, subframes 0, 4, 5, and 9 may not be configured as MBSFN subframes. In TDD, subframes 0, 1, 5, and 6 may not be configured as MBSFN subframes.

Unlike the PSS/SSS design described above in relation to the LTE standards, the PSS/SSS/PBCH design is a work in progress under the NR/5G standards as of the time of this filing. In some cases, under the NR standards, PSS/SSS/PBCH may have a different bandwidth than that of LTE, which has a bandwidth of about 1.08 MHz. In addition, in some cases, under the NR standards, PSS/SSS/PBCH may not be centered. Also, in some cases, PSS/SSS/PBCH may have a different numerology under NR than under LTE (e.g., 30 kHz in NR vs. 15 kHz in LTE). Further, in some cases, PSS/SSS/PBCH time domain may still be in subframe 0 under NR.

In NR, the UE may derive the subframe and/or slot index from PSS/SSS. Further, under NR, a subframe may still be 1 ms but a subframe may be used only for physical time indexing purposes, because resource management in NR is performed on a per-slot basis (e.g. scheduling is performed based on slots). Within the NR framework, each slot may have a duration of 1 ms, 0.5 ms, 0.25 ms, 0.125 ms, etc. In some cases, the duration of each slot may depend on the numerology (15 kHz, 30 kHz, 60 kHz, or 120 kHz, etc.) and/or the number of symbols per slot (e.g. 7 or 14).

In some cases, LTE and NR may be employed in a co-channel manner (e.g. where NR may share an uplink and/or downlink carrier frequency with LTE). This may be performed in various ways. In one example, an LTE downlink (DL) carrier may be with frequency f1, an NR DL carrier may be with frequency f2 (e.g. where f2=f1), while both LTE and NR may share a UL carrier with frequency f3≠f2=f1. In another example, LTE DL and NR DL may share the same carrier frequency. In cases where an NR DL and an LTE DL share the same carrier frequencies, the NR DL may be supported in the LTE subframes (e.g. in only MBSFN or both MBSFN and non-MBSFN subframes).

As stated above, in some cases, NR DL may be supported only in MBSFN subframes of LTE. However, in such cases, due to the restriction of non-MBSFN subframes in subframes 0, 4, 5, and 9 (FDD) or 0, 1, 5, and 6 (TDD), NR PSS/SSS/PBCH may not be supported in subframe 0 based on the LTE subframe indexing. In some other cases, NR may be supported in both LTE MBSFN subframes and LTE non-MBSFN subframes. In such cases, NR PSS/SSS/PBCH may be supported in subframe 0 based on LTE subframe indexing, but due to a difference in numerology between NR and LTE, a gap may be placed between NR PSS/SSS/PBCH and LTE PSS/SSS/PBCH.

Figure 8:
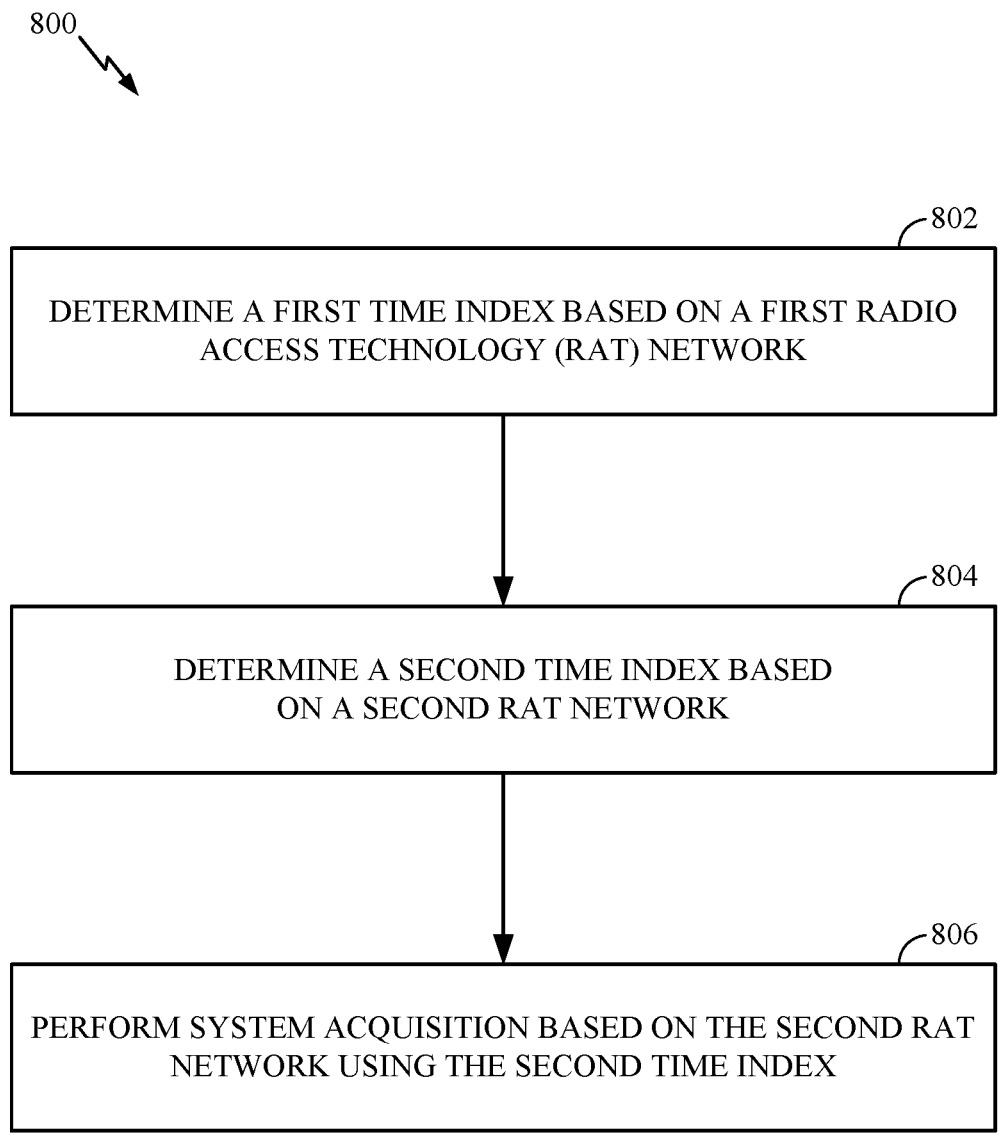
FIG. 8 illustrates example operations relating to handling time indexing, in accordance with aspects of the present disclosure.

FIG. 8 illustrates example operations 800 relating to handling time indexing in LTE-NR co-existence, according to aspects of the present disclosure. Operations 800 may be performed, for example, by a UE.

Figure 9:
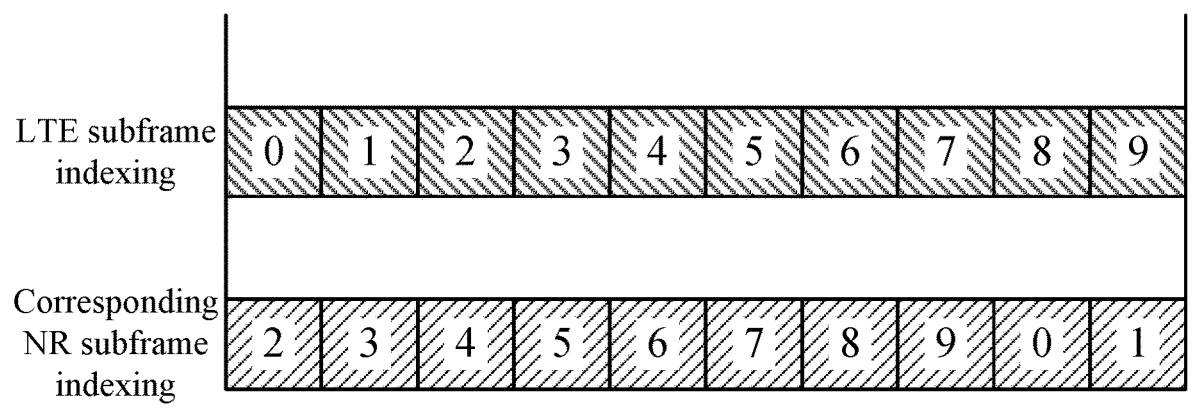
FIG. 9 illustrates an example of using different subframe indexing for LTE than NR, in accordance with aspects of the present disclosure.
Figure 10:
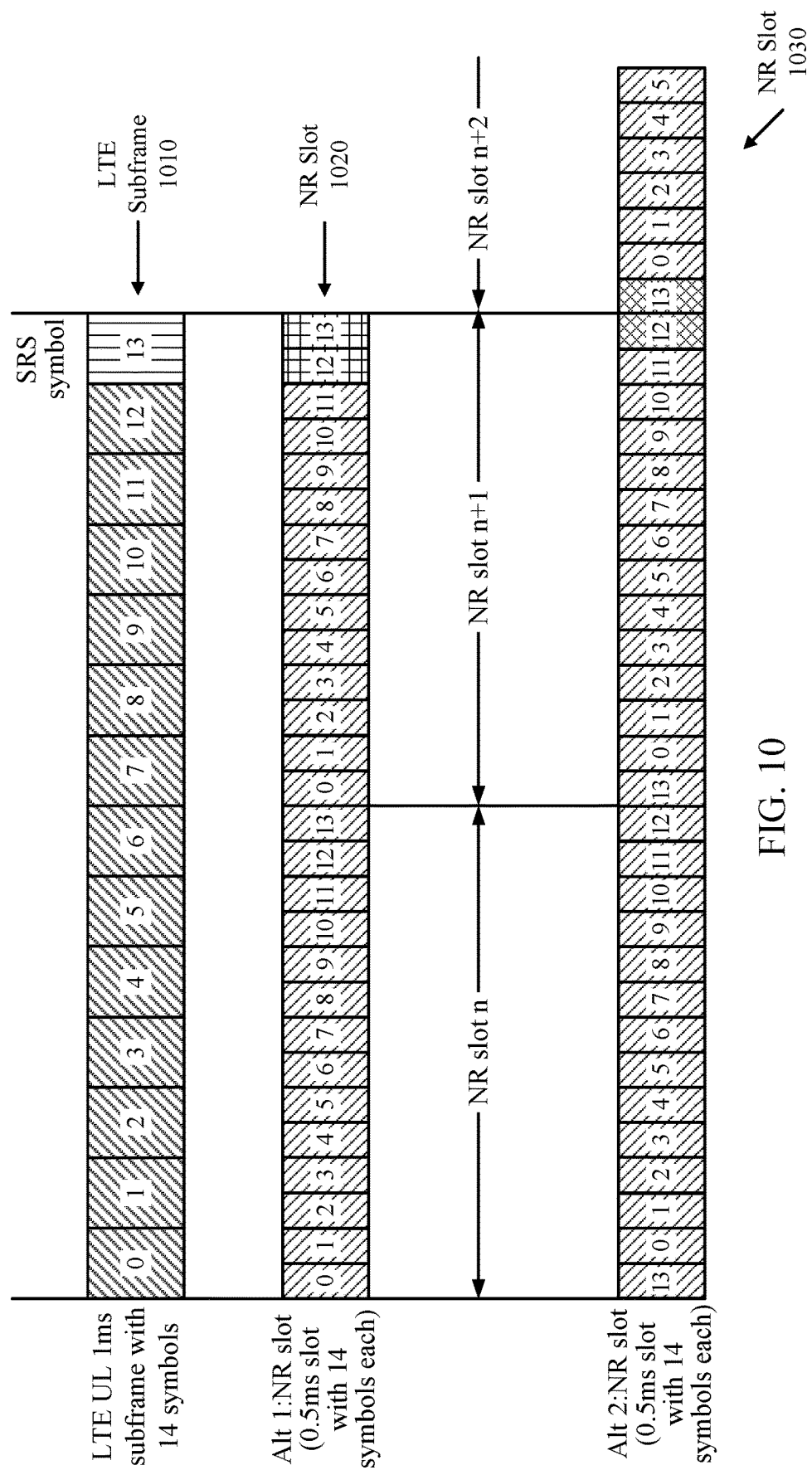
FIG. 10 illustrates an example of subframe indexing for avoiding collision between an LTE SRS symbol and one or more NR symbols, in accordance with aspects of the present disclosure.

Operations 800 begin, at 802, by determining a first time index based on a first radio access technology (RAT) network. As described herein, a time index may refer to, for example, a subframe index or a slot index. An example of LTE and NR time indexing is shown in FIGS. 9 and 10. FIG. 9, for example, shows LTE subframe indexes 0-9. FIG. 10, for example, shows the relationship or comparison between LTE slot indexing and NR slot indexing.

As described above, in LTE, PSS/SSS may be transmitted in subframes 0 and 5 of every frame (i.e., 10 subframes). The arrangement or the location of PSS/SSS in subframe 0 and the arrangement or the location of PSS/SSS in subframe 5 may enable the UE to detect the subframe indices after detecting PSS/SSS. As such, as further described below, in embodiments where LTE and NR are employed in a co-channel manner, a UE (e.g., UE 120) may determine the LTE time index (e.g., subframe and/or slot index) based on, for example, a detection of a synchronization signal (e.g., PSS/SSS) in the LTE RAT network.

At 804, operations 800 continue by determining a second time index based on a second RAT network. Having determined the LTE time, the UE then determines the NR time index based on the NR RAT network. For example, as described below, in some embodiments, the UE determines the NR time index using signaling provided in the LTE RAT network. In such an example, the LTE carrier may indicate the presence of NR in MBSFN subframes (e.g. in system information blocks (SIBs)) to facilitate the reception of NR PSS/SSS/PBCH by NR UEs, if the NR UEs are also capable of LTE initial access. In some embodiments, the UE determines the NR time index based on detecting one or more PSS/SSS in the NR RAT network having assumed that NR PSS/SSS/PBCH is always transmitted in certain subframes (e.g., 3 or 8). Also, as described below, in embodiments where the LTE and NR RAT networks have different time indexes, the UE determines the NR time index based on a detection of PSS/SSS in the LTE RAT network and a relationship between the subframe indexes in the first and second RAT networks. For example, the UE may determine the subframe indexing offset between LTE and NR based on how subframe indexing of LTE and NR correspond.

At 806, operations 800 further continue by performing system acquisition based on the second RAT network using the second time index. Having determined the NR time indexing, the UE is then able to receive the NR PSS/SSS/PBCH, which assist the UE in performing system or cell acquisition (e.g., acquire system timing, frequency offset, and the cell ID). In some embodiments, the term "system or cell acquisition" may refer to searching for a cell and/or acquiring the cell (e.g., synchronizing to the cell). More particularly, in some embodiments, from the PSS, the UE discovers symbol timing and some information about the physical cell ID. From the SSS, the UE discovers frame timing, the physical cell ID, the transmission mode (FDD or TDD) and the cyclic prefix duration. Subsequently, the UE starts reception of the cell specific reference signals (CRS), which provide an amplitude and phase reference for the channel estimation process. The UE then receives the PBCH and reads the master information block (MIB), allowing it to discover the number of transmit antennas at the BS (e.g., BS 110), the downlink bandwidth, etc. After this, the UE is able to receive the physical control format indicator channel (PCFICH) in order to read the control format indicators, which provide an indication as to the number of symbols that are reserved at the start of each downlink subframe for the physical control channels and the number of symbols available for data transmission. At this point, the UE is able to receive the PDCCH, allowing the UE to read the remaining system information blocks (SIBs) that are transmitted on the PDSCH. This enables the UE to discover all the remaining details about how the cell is configured etc.

As described above, operations 800 are performed by a UE (e.g., UE 120), which includes means for performing such operations. Particularly, the UE comprises a processing element (e.g., controller/processor 240) for performing steps 802-806 of operations 800. In addition, the UE includes means for transmitting and receiving signals, including a reception/transmission element (e.g., antenna 234, demodulator/modulator 232, etc.) for performing operations 800, including, e.g., the performing of system acquisition.

As discussed above, in some embodiments, NR DL may be only supported in MBSFN subframes of LTE. To address the subframe indexing issue relating to the restriction of non-MBSFN subframes in subframes 0, 4, 5, and 9 (FDD) or 0, 1, 5, and 6 (TDD), as described above, at least two time indexing schemes may be implemented. The first time indexing scheme may use the same subframe indexing to be shared between LTE and NR and also allow NR PSS/SSS/PBCH to be transmitted in subframes other than 0 and 5. For example, in some embodiments, NR PSS/SSS/PBCH may use subframes 3 and 8.

It may be noted that under LTE TDD, subframe 2 is always an uplink (UL) subframe, which may limit the choice of subframes for NR PSS/SSS/PBCH to subframe 8. To avoid this, in some embodiments, NR may have the same design (e.g. NR PSS/SSS/PBCH may use the same subframe) regardless of whether MBSFN subframes are used in LTE FDD or LTE TDD. If the same subframe is used under both LTE TDD and LTE FDD, subframes 2 and 7 may not be appropriate for NR PSS/SSS/PBCH. In some other embodiments, NR PSS/SSS/PBCH may use different subframes in LTE FDD versus LTE TDD systems. For example, under LTE FDD subframes 2 and 7 may be used while subframes 4 and 9 may be used under TDD. Although, such embodiments may not be ideal for all deployments or scenarios.

In some embodiments, a NR UE may assume that NR PSS/SSS/PBCH is always transmitted in certain subframes (e.g., 3 or 8). In some other embodiments, the NR UE may perform hypotheses detection to determine whether the transmitting cell is a standalone NR-only cell (e.g., in which case NR PSS/SSS/PBCH may be transmitted in subframes 0 or 5) or an LTE-NR co-existence cell (e.g., in which case NR PSS/SSS/PBCH may be transmitted in subframes 3/8). In some embodiments, the LTE carrier may indicate the presence of NR in MBSFN subframes (e.g. in system information blocks (SIBs)) to facilitate the reception of NR PSS/SSS/PBCH by NR UEs, if the NR UEs are also capable of LTE initial access.

As described above, to address the subframe indexing relating to the restriction of non-MBSFN subframes in subframes 0, 4, 5, and 9 (FDD) or 0, 1, 5, and 6 (TDD), a second time indexing scheme may be used in some embodiments. The second time indexing scheme may use a different subframe index between LTE and NR, while NR PSS/SSS/PBCH may still be transmitted in subframes, such as, 0 and/or 5. For example, LTE may have subframes 0, 1, 2, 3 . . . 9, while the same subframes may be indexed for NR as subframes 8, 9, 0, 1 . . . 7.

An example of using different subframe indexing for LTE than NR is illustrated by FIG. 9, where NR subframes 5 and 0 correspond to LTE subframes 3 and 8, respectively. In some other embodiments (not shown), LTE subframe 8 may, for example, correspond to NR subframe 5 and LTE subframe 3 may correspond to NR subframe 0. Accordingly, in some embodiments, if the UE is served by both LTE and NR cells, the UE may determine the subframe indexing offset between LTE and NR based on how subframe indexing of LTE and NR correspond. In some embodiments, the same time indexing handling may be performed in UL. For example, NR DL and NR UL may have the same subframe indexing.

In some embodiments, when LTE UL co-exists with NR UL, NR UL may need to avoid collision with the sounding reference signal (SRS) symbol in LTE. The SRS symbol in LTE is typically the last symbol of an UL subframe. It is also important to note that LTE and NR may have different numerology (e.g., NR 30 kHz while LTE 15 kHz). Accordingly, in an LTE UL subframe, there may be one or more NR slots with the same or different numerology.

This is further illustrated by FIG. 10. FIG. 10 shows a 1 millisecond LTE UL subframe with symbols 0 through 13, where the 14$^{th}$ symbol is an LTE SRS symbol. As described above, in embodiments where LTE UL co-exists with NR UL, NR UL may need to avoid collision with the SRS symbol in LTE. In some embodiments, to avoid colliding with the LTE SRS symbol (assuming NR is 30 kHz tone spacing), NR may skip the transmission of two symbols in one NR slot. For example, NR slot (e.g. shown as Alt. 1 as symbols 12 and 13 in NR slot n+1). In some other embodiments, there may be a symbol shift in NR, to distribute the impact over two slots (e.g. shown as Alt. 2 as symbols 12 in NR slot n+1 and symbol 13 in NR slot n+2). In some embodiments, alternative 2 may be detrimental to front-loaded DM-RS in UL.

As discussed above, in some embodiments, NR may be supported in both LTE MBSFN subframes and LTE non-MBSFN subframes. In such embodiments, the same subframe indexing may be used between LTE and NR. In addition, NR PSS/SSS/PBCH may be transmitted in subframes other than 0 and 5. However, due to a difference in numerology between NR and LTE, a gap or guard may be placed between NR PSS/SSS/PBCH and LTE PSS/SSS/PBCH. In some embodiments, if the LTE bandwidth is small (e.g. 5 MHz or lower), frequency division multiplexing (FDM) NR PSS/SSS/PBCH and LTE PSS/SSS/PBCH may not be possible. In such embodiments, the LTE-NR co-existence may be supported for larger LTE bandwidths. In some other embodiments, different subframe indexing may be used for LTE than NR when they co-exist in the same cell.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13, 17, and 18.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment, comprising:
   determining a first time index in a first subframe indexing associated with a first radio access technology (RAT) network based on a detection of at least one synchronization signal communicated using the first RAT network;

determining a second time index in a second subframe indexing associated with a second RAT network, wherein the second subframe indexing is different from the first subframe indexing by an indexing offset, wherein the second subframe indexing and the first subframe indexing are associated with different time indexes for a same time, wherein communication in the second RAT network corresponds to a configuration of multicast-broadcast single-frequency network MBSFN communications in the first RAT network, and wherein at least one of a downlink carrier frequency or an uplink carrier frequency is shared between the first RAT network and the second RAT network; and performing system acquisition based on the second RAT network using the second time index.

2. The method of claim 1, wherein:
the second time index is determined by signaling provided in the first RAT network.

3. The method of claim 2, wherein the signaling is provided in a system information block.

4. The method of claim 2, wherein the signaling indicates the indexing offset, and wherein the indexing offset comprises at least one of a slot or symbol offset relative to a subframe index in the first RAT network.

5. The method of claim 1, wherein the second time index is determined based on:
detection of one or more synchronization signals in the second RAT network; and
the one or more synchronization signals are only present in certain transmission time intervals (TTIs).

6. The method of claim 1, wherein communication in the second RAT network is limited to subframes used for the multicast broadcast single frequency network (MBSFN) communications in the first RAT network.

7. The method of claim 1, wherein the first and the second time indexes are determined based on one or more synchronization signals of the first and the second RAT networks that occur in a same subframe separated by a frequency gap.

8. The method of claim 1, wherein:
the second time index is determined based on detection of one or more synchronization signals in the first RAT network and a relationship between the subframe indexes in the first and second RAT networks.

9. The method of claim 8, wherein the one or more synchronization signals comprise a primary synchronization signal (PSS), a secondary synchronization signal (SSS) and a physical broadcast channel (PBCH).

10. The method of claim 1, wherein:
the first time index is determined by detecting a synchronization signal in the first RAT network; and
the second time index is determined based, at least in part, on whether frequency division duplexing (FDD) or time division duplexing (TDD) is used in the first RAT network.

11. The method of claim 10, wherein the first RAT network is LTE and the second RAT network is NR.

12. The method of claim 11, wherein subframes 2 and 7 may be used by NR under LTE FDD, while subframes 4 and 9 may be used by NR under LTE TDD.

13. The method of claim 11, wherein at least one of NR synchronization signals is put in LTE subframes 3 and 8.

14. The method of claim 1, further comprising:
using the second time index to avoid uplink transmissions in the second RAT network on symbols used for transmitting sounding reference symbols in the first RAT network.

15. The method of claim 1, wherein the first time index and the second time index is the same, and communication in the second RAT network is performed including subframes used for multicast broadcast single frequency network (MBSFN) communications and subframes used for non-MBSFN communications in the first RAT network.

16. The method of claim 1, wherein the first time index and the second time index is the same, and at least one of a synchronization signal or a physical broadcast channel for the second RAT network is detected in a subframe different from that of the first RAT network.

17. The method of claim 1, wherein at least one of synchronization signal or a physical broadcast channel for the first RAT network is associated with a first numerology, and at least one of synchronization signal or a physical broadcast channel for the second RAT network is associated with a second numerology, different than the first numerology.

18. The method of claim 1, wherein the second time index is determined for at least one of a downlink, an uplink, or a sidelink.

19. An apparatus for wireless communications, comprising:
a processing system configured to:
determine a first time index in a first subframe indexing associated with a first radio access technology (RAT) network based on a detection of at least one synchronization signal communicated using the first RAT network;
determine a second time index in a second subframe indexing associated with a second RAT network, wherein the second subframe indexing is different from the first subframe indexing by an indexing offset, wherein the second subframe indexing and the first subframe indexing are associated with different time indexes for a same time, wherein communication in the second RAT network corresponds to a configuration of multicast-broadcast single-frequency network MBSFN communications in the first RAT network, and wherein at least one of a downlink carrier frequency or an uplink carrier frequency is shared between the first RAT network and the second RAT network; and
perform system acquisition based on the second RAT network using the second time index.

20. The apparatus of claim 19, wherein:
the second time index is determined by signaling provided in the first RAT network.

21. The apparatus of claim 19, wherein the second time index is determined based on:
detection of one or more synchronization signals in the second RAT network; and
the one or more synchronization signals are only present in certain transmission time intervals (TTIs).

22. The apparatus of claim 19, wherein communication in the second RAT network is limited to subframes used for the multicast broadcast single frequency network (MBSFN) communications in the first RAT network.

23. The apparatus of claim 19, wherein the first and the second time indexes are determined based on the one or more synchronization signals of the first and the second RAT networks that occur in a same subframe separated by a frequency gap.

24. The apparatus of claim 19, wherein:
the second time index is determined based on detection of one or more synchronization signals in the first RAT network and a relationship between the subframe indexes in the first and second RAT networks.

25. An apparatus for wireless communications, comprising:
   means for determining a first time index in a first subframe indexing associated with a first radio access technology (RAT) network based on a detection of at least one synchronization signal communicated using the first RAT network;
   means for determining a second time index in a second subframe indexing associated with a second RAT network, wherein the second subframe indexing is different from the first subframe indexing by an indexing offset, wherein the second subframe indexing and the first subframe indexing are associated with different time indexes for a same time, wherein communication in the second RAT network corresponds to a configuration of multicast-broadcast single-frequency network MB SFN communications in the first RAT network, and wherein at least one of a downlink carrier frequency or an uplink carrier frequency is shared between the first RAT network and the second RAT network; and
   means for performing system acquisition based on the second RAT network using the second time index.

26. The apparatus of claim 25, wherein:
   the second time index is determined by signaling provided in the first RAT network.

27. The apparatus of claim 25, wherein the second time index is determined based on:
   detection of one or more synchronization signals in the second RAT network; and
   the one or more synchronization signals are only present in certain transmission time intervals (TTIs).

28. The apparatus of claim 25, wherein communication in the second RAT network is limited to subframes used for the multicast broadcast single frequency network (MBSFN) communications in the first RAT network.

29. The apparatus of claim 25, wherein the first and the second time indexes are determined based on one or more synchronization signals of the first and second RAT network that occur in a same subframe separated by a frequency gap.

* * * * *